United States Patent [19]
Desautels et al.

[11] Patent Number: 5,669,852
[45] Date of Patent: Sep. 23, 1997

[54] TWO-POSITION NEUTRAL SWITCH FOR MULTI-SPEED TRANSMISSION

[75] Inventors: Thomas Desautels, West Bloomfield; Charles E. Allen, Jr., Rochester Hills, both of Mich.; Jon M. Huber, Laurinburg, N.C.; Edward M. Bacon, Northville; Steve M. Weisman, Farmington Hills, both of Mich.; Steven E. Radue, Southern Pines, N.C.

[73] Assignees: Rockwell International Corporation; Detroit Diesel Corporation

[21] Appl. No.: 508,067

[22] Filed: Jul. 27, 1995

[51] Int. Cl.⁶ ................................................. B60K 41/08
[52] U.S. Cl. ................................... 477/111; 200/61.91
[58] Field of Search .......................... 477/111; 200/61.91

[56] References Cited

U.S. PATENT DOCUMENTS

| | | | |
|---|---|---|---|
| 3,748,417 | 7/1973 | Morino et al. | 200/61.91 |
| 4,200,007 | 4/1980 | Espenschied et al. | |
| 4,275,618 | 6/1981 | Bale | 74/878 |
| 4,371,051 | 2/1983 | Achterholt | 477/111 |
| 4,388,843 | 6/1983 | Teeter | |
| 4,415,786 | 11/1983 | Takada et al. | 200/61.91 |
| 4,508,088 | 4/1985 | Hasegawa et al. | 477/111 |
| 4,541,307 | 9/1985 | Bellah | 200/61.91 |
| 4,593,580 | 6/1986 | Schulze | |
| 4,651,694 | 3/1987 | Kataoka | 477/111 |
| 4,811,224 | 3/1989 | Kuerschner et al. | |
| 4,944,194 | 7/1990 | Tanoue et al. | 74/335 |
| 5,031,472 | 7/1991 | Dutson et al. | 200/61.91 |
| 5,345,841 | 9/1994 | Tweed et al. | 477/111 |
| 5,411,450 | 5/1995 | Gratton et al. | 477/124 |

FOREIGN PATENT DOCUMENTS

| | | |
|---|---|---|
| 0242086 | 4/1987 | European Pat. Off. |
| 0364220 | 10/1989 | European Pat. Off. |
| 0383436 | 1/1990 | European Pat. Off. |

*Primary Examiner*—Dirk Wright

[57] ABSTRACT

An improved switch system is incorporated into a multi-speed transmission and engine combination. The switch system provides a positive electronic signal to an electronic control unit for the engine of both when the transmission is in a neutral state and when the transmission is in a gear-engaged state. In one embodiment, a switch plunger rides within a switch housing between two extreme positions. The switch plunger is at one axial position when the transmission is in neutral, and at the other axial position when the transmission is in a gear-engaged state. At either position, an electric circuit is completed and a signal is sent to an electronic control unit. The electronic control unit is thus provided with positive position feedback for the transmission. The electronic control unit will preferably also have the ability to control the engine speed to synchronize the engine speed with a desired engine speed for the next selected gear ratio to achieve synchronization between the speeds when the shift if completed. The electronic control unit does not begin to modify the engine speed until it has received a positive signal that the transmission is in neutral.

24 Claims, 2 Drawing Sheets

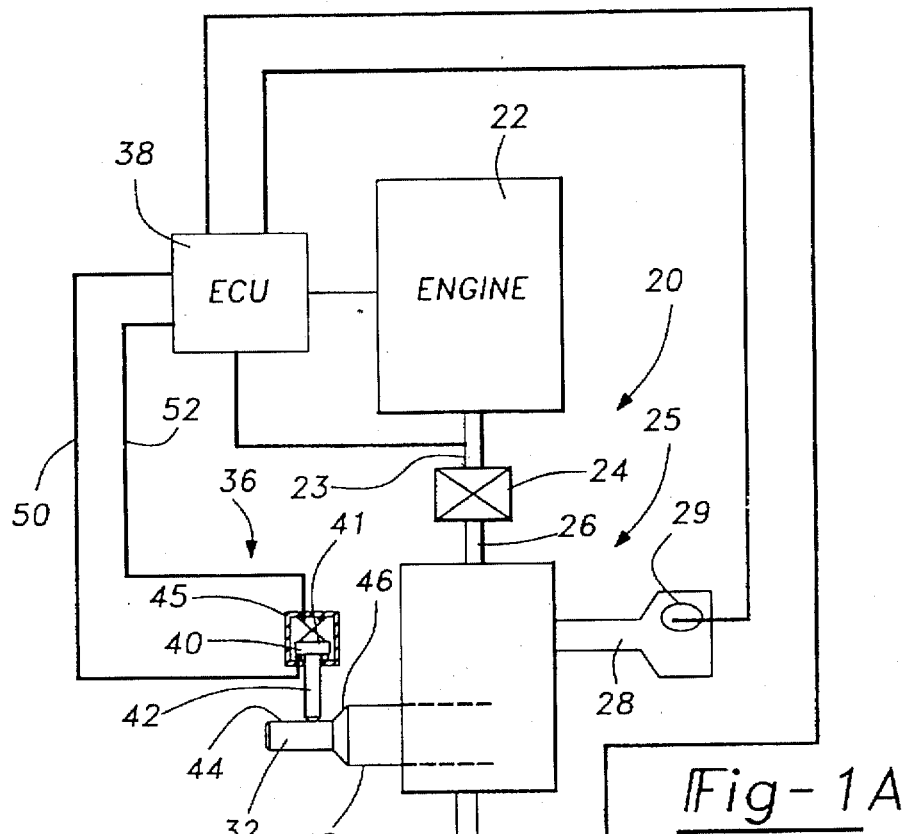
Fig-1A
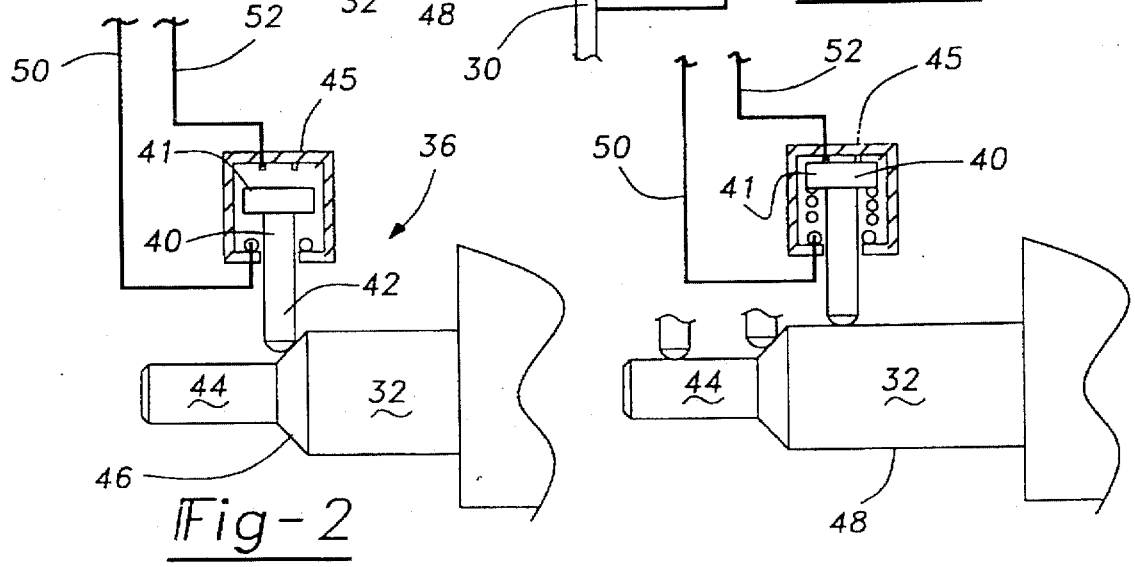
Fig-2
Fig-3

TWO-POSITION NEUTRAL SWITCH FOR MULTI-SPEED TRANSMISSION

BACKGROUND OF THE INVENTION

This application relates to an improvement in switches incorporated into multi-speed transmissions which provides a positive signal of when the transmission is in a gear-engaged state and when the transmission is in a neutral state.

Heavy vehicles are typically equipped with a manually activated multi-speed transmissions that may be shifted to provide several different speed ratios. The multi-speed transmission applies the several different speed ratios to the input from an engine, resulting in several different outlet speeds at the transmission output shaft. Typically, a clutch provided between the engine and the transmission may be selectively actuated by the vehicle operator to break the transmission between the engine and the multi-speed transmission. The clutch is typically actuated as the operator moves the transmission out of gear, and further assists the operator in re-engaging a gear to provide the next selected speed ratio.

The clutching associated with the shifting is relatively complicated in heavy vehicles. Moreover, modem heavy vehicles have become equipped with more and more controls that require complicated operating procedures. As such, it would be desirable to reduce the complexity of routine vehicle operation, such as changing the speed ratio of the multi-speed transmission.

To this end, the prior art has proposed systems wherein it is not necessary to actuate the clutch to shift the transmission. In one proposed system, an engine controller attempts to achieve a zero torque load between the engine and the transmission allowing the operator to move the gear out of engagement to a neutral position. The proposed system then attempts to synchronize the engine input speed to a speed that will assist in re-engagement of the gear.

These proposed systems are impractical. One major impracticality is that the proposed system does not include a positive feedback signal of the state of the multi-speed transmission. It would be undesirable to begin changing engine speed to synchronize the speed unless there is a clear indication that the transmission is in neutral. If the engine control begins to change engine speed and the transmission is actually in gear, this would affect the speed of the vehicle independent of any driver input, which would be undesirable. Moreover, the proposed system does not include any positive signal of when the transmission has been re-engaged at the new gear, such that the engine control knows when to return control of the engine speed to the vehicle operator.

Standard transmissions do include a switch which provides some indication of when the transmission is in neutral. Typically, this switch includes a moving shaft which engages other portions of the transmission to provide a signal of when the transmission is in neutral. The switch typically does not provide a positive signal of both neutral and gear-engaged states. Instead, a positive signal is only provided at one of the two states. If the positive signal is not sensed, then the control assumes that the other state is in place. This is somewhat deficient in that there is a transition stage between fully engaged and neutral, and a more sophisticated control would benefit from knowledge of when the transmission is in this transition state. Further, as noted above, it would be undesirable to begin to actuate speed control if the transmission is in gear. For that reason, it would be desirable to provide positive position feedbacks of both gear-engaged and neutral positions for the transmission.

At least one proposed system for an automatically adjusted multi-speed transmission discusses having signals at both a neutral and gear-engaged position. This system does not appear to be based upon mechanical actuation that would provide certainty as to the neutral or gear-engaged states. Rather, it would appear that this prior art system is based more upon counting movement of a motor that adjusts the speed of the transmission to determine the state of the transmission. With the type of speed synchronization systems envisioned by this invention, a positive signal of the actual state of the transmission would be more desirable than this proposed type system.

SUMMARY OF THE INVENTION

A disclosed embodiment of this invention includes a switching system that provides positive indications of both when a transmission is in neutral, and when the transmission is in a gear-engaged state. The switch is actuated by a mechanical shaft that is moved during movement of the transmission members. The shaft is mechanically connected to be in a certain position when the transmission is in neutral, and to be in a second position when the transmission is engaged. These positive signals are sent to an electronic control unit for an engine. The positive signals allow the electronic control unit to know precisely which state the transmission is in, and to affect engine speed controls based upon that state.

In one embodiment of this invention, the electronic control unit controls an engine that drives a multi-speed transmission through a clutch. A mechanical "neutral" shaft is associated with the transmission and moves as the transmission moves between gear-engaged and neutral states. In one preferred embodiment, the "neutral" shaft has a ramped surface, and the switch includes a switch plunger that moves along the ramped surface. The neutral shaft is connected to be mechanically moved by transmission components as the transmission moves between gear-engaged and neutral states. The plunger switch moves along the ramped surface with this change. The plunger switch completes an electrical contact at two extreme positions—one associated with a neutral state and one associated with a gear-engaged state. If a positive signal is received from either of the two contacts, then the electronic control unit knows precisely what state the transmission is in. If no signal is received, then the electronic control unit can determine that the transmission is in a transition phase between the neutral and gear-engaged modes. The electronic control unit can also look for a sequence between the two states. As an example, should the electronic control unit sense that the transmission has moved out of the gear-engaged state into transition state, the electronic control unit can sense the amount of time until the neutral state switch is engaged. If an undue amount of time is sensed, then a fault may be determined. Similarly, if the electronic control unit senses movement from neutral toward the gear-engaged state that lasts for an undue amount of time, a fault may also be indicated.

In a preferred method of controlling an engine according to the present invention, an operator provides an indication to an electronic control unit that a gear shift is being anticipated. The electronic control unit may control the engine to assist the operator in moving the transmission to a neutral state. The inventive neutral switch system provides a positive signal to the electronic control unit of when the transmission is engaged in gear. The electronic control unit thus can determine when the transmission has moved out of gear in a transition phase. The electronic control unit can also determine when the transmission has moved fully to the neutral state, since another switch contact will be made at that position. Once the electronic control unit is provided with a positive signal that the transmission is in neutral, then the electronic control unit begins to control the engine speed to approximate a desired engine speed at the next expected gear ratio. This engine synchronization assists the operator in re-engaging the transmission at the next desired gear. The operator then re-engages the gear, and a positive signal is then sent to the electronic control unit that the gear is engaged. The electronic control unit may then return the operation of the engine to the operator.

These and other features of the present invention can be best understood from the following specification and drawings, of which the following is a brief description.

BRIEF DESCRIPTION OF THE DRAWINGS

FIG. 1A is a highly schematic view of an engine and transmission system.

FIG. 2 shows the movement of a neutral switch system in a transition.

FIG. 3 shows the neutral switch system in a neutral position.

DETAILED DESCRIPTION OF A PREFERRED EMBODIMENT

Figure 1B:
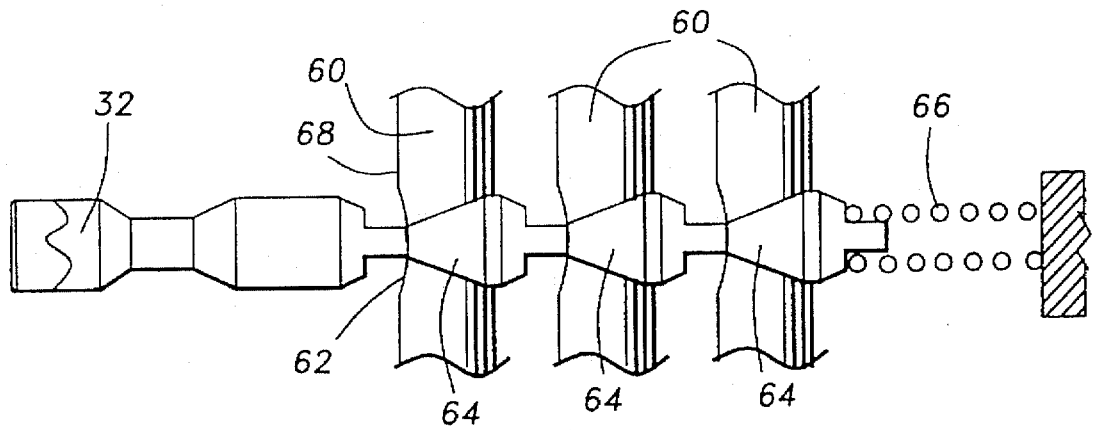
FIG. 1B shows mechanical connections of structure within the transmission that drives a neutral shaft.

FIG. 1A is a schematic of a vehicle drive train 20 incorporating an engine 22, an engine output shaft 23, a selectively actuated clutch 24, and a transmission 25 having an input shaft 26 driven by the engine output shaft 23 through clutch 24. Transmission 26 is a multi-speed transmission, that can provide various gear ratios between its input shaft 26 and output shaft 30. A stick shift 28 with a shift intent button 29 allows an operator to change the speed ratio in the transmission 25 to change the ratio of the input speed at input shaft 26 relative to the output shaft 30. The structure of the transmission 25 may be as known in the art.

Transmission 25 also includes a neutral shaft 32. Neutral shaft 32 moves inwardly and outwardly as the transmission 25 moves between gear-engaged and neutral states. The prior art used a neutral shaft to send a single signal.

A neutral switch system 36 forms the inventive aspects of this Application. Neutral switch 36 sends signals to an electronic control unit 38 for the engine 22. The neutral switch system 36 incorporates a switch plunger 40 having a head 41 and a forward portion 42 that contacts a cam profile surface of neutral shaft 32. As shown in FIG. 1A, a forward relatively small portion 44 of the neutral shaft 32 is contacted by switch plunger 40. In this position, switch plunger 40 is positioned at a forward extreme within housing 45 and completes a circuit between the contacts at the forward end of housing 45. Neutral shaft 32 includes a ramped portion 46 and a relatively thicker portion 48. In the position shown in FIG. 1A, the transmission 25 is in a gear-engaged position. The electrical contact is completed by the head 41 of the plunger 40 and the bottom of housing 45. A signal that the gear is engaged is sent through line 50 to the electronic control unit 38. Thus, a positive signal is sent to the electronic control unit that the gear is engaged.

FIG. 1B shows a portion of neutral shaft 32 within the transmission housing. The portion shown in FIG. 1A is to the left of the FIG. 1B and not illustrated. The transmission includes a number of shift rails 60 that reciprocate with movement of the shift lever to shift the transmission. Those shift rails have cammed surfaces 62 that engage mating frustro-conical portion 64 on the neutral shaft 32. A spring 66 biases the neutral shaft to a position forced outwardly of the transmission. In the position shown in FIG. 1B the ramped surfaces 62 allow the spring 66 to force the neutral shaft 32 outwardly from the transmission. In this state, the transmission is in neutral, with no gear engaged.

Figure 1C:
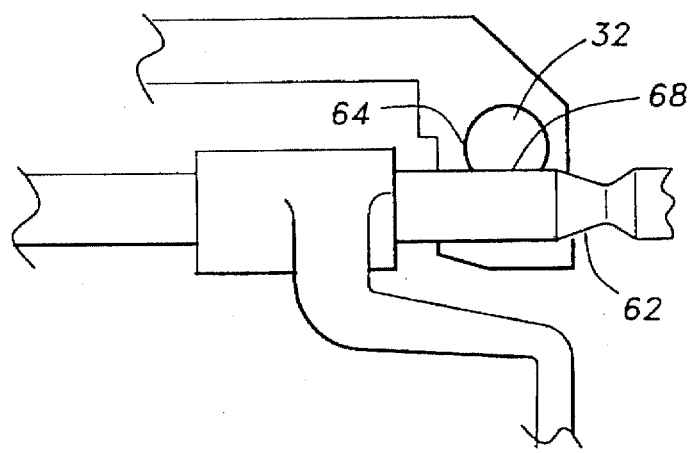
FIG. 1C shows other structure of the mechanical connection within the transmission.
Figure 4:
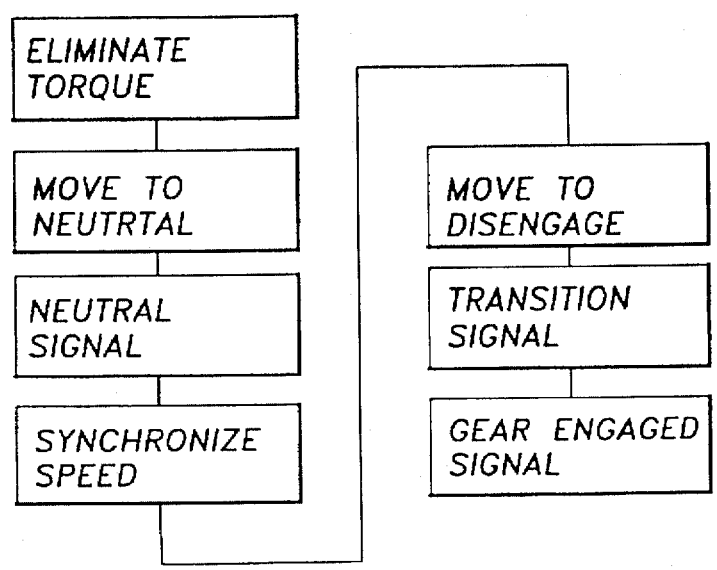
FIG. 4 is a flow chart of the logic utilized by the electronic control unit to control the engine speed.

FIG. 1C shows the shift rail 60 having been moved to a position where it has engaged a gear. As shown, the ramped surface 62 is no longer aligned with the frustro-conical portion 64 on neutral shaft 32. Instead, a thicker portion 68 is aligned with the neutral shaft 32. This thicker portion 68 engages the frustro-conical portion 64 and force it to be biased inwardly against the force of spring 66. In this position, the neutral shaft 32 is indicating a gear-engaged position, as shown in FIG. 1A. Thus, mechanical interconnections within the transmission ensure that the movement of the neutral shaft 32 is directly tied to the state of the transmission. The position of the neutral shaft 32 is thus a positive indication of whether the transmission is in neutral or a gear-engaged state.

As shown in FIG. 2, when the transmission begins moving out of engagement to a neutral position, the neutral shaft 32 moves to the left from the position shown in FIG. 1A. As the neutral shaft 32 moves in this direction, the forward portion 42 of switch plunger 40 begins to ride up ramped surface 46. In this position, the head 41 does not complete electric contact at either position within housing 45. As such, no signal is sent to the electronic control unit through either line 50 or 52. The electronic control unit now knows that the transmission is in transition between engaged and neutral states. The electronic control unit monitors the time between the engaged states to identify faults. If the transmission is in "transition" for too long, a fault is indicated.

When such a fault is sensed, a counter is incremented. The counter may be decremented by a good shift wherein there is not a transition for too long a period of time. A good shift may decrement the counter by a greater number than a bad shift would increase the counter. A fault signal could be actuated in the vehicle cab should the number of identified faults indicate that a trend is beginning to indicate the switch is failing. That is, if the counter reaches a relatively high number indicating that faults are occurring on most shifts, then the signal should be actuated. On certain shifts the operator may himself control the operation such that the transmission is in transition for an unusual time. As such, the counter is decremented on a good shift. Preferably, even when the counter is decremented the total number of faults is retained in a second counter for diagnostic purposes.

On the other hand, if both switches are ever indicated as being engaged, a fault is also identified. In such a case, then the speed ratio is compared to expected speed ratios and a determination is made as to whether the transmission is in gear or is in neutral based upon whether the actual speed ratio matches an expected speed ratio as outlined above.

As shown in FIG. 9, the neutral shaft 92 has now moved to an outermost extent. The transmission is now in neutral, with no gear engagement. As shown, forward portion 44 is received within valve 94. A range shift can now occur. As also shown, the inventive plunger switch 40 is now in contact with the thicker portion 48. Head 41 is now driven to a second extreme position in housing 45, and an electric circuit is again completed. A signal of this position is sent through line 52 to the electronic control unit 38.

Although the movement of the switch plunger 40 is shown to extend beyond the ramp portion 46, in practice, it may only be necessary to utilize the extremes of the ramped portion to define the extreme positions for the neutral and gear-engaged locations of switch 40. In addition, if some geometric dimensions require additional link for the switch plunger, a separate shaft may be placed intermediate the switch plunger 40 and the surface of the neutral shaft 32.

The inventive switch providing positive feedback of both gear-engaged and neutral states is an improvement over the prior art. In the prior art, only one position was provided with a positive signal.

As shown in FIG. 1A, signal line 50 and signal line 52 are two digital signals. Alternatively, the two signal lines 50 and 42 could be combined with distinct resistances into a single analog signal.

The new switch system with positive feedback is particularly valuable in a system which attempts to control the engine speed to eliminate the need for clutching when shifting gears. In one such inventive system illustrated, the ECU 38 senses through an operator input, such as switch 29, that the operator would like to move the transmission to neutral. The electronic control unit 38 would then "break" the torque load between the engine and the transmission without clutching. Essentially, the electronic control unit will attempt to change the engine output to eliminate any torque load on the transmission 25. At that point, the operator should be able to move the transmission 25 to neutral. As the transmission begins to move towards neutral, the plunger 40 will begin to move from the position shown in FIG. 3 to a position approximately equal to that shown in FIG. 2. It should be noted that this movement will occur independent of whether the operator uses a clutch of the ECU to break the torque load. The electronic control unit will now know that the neutral shaft 32 has begun moving toward neutral. Eventually, the neutral shaft 32 will reach the position shown in FIG. 3, and the electronic control unit 38 will be provided a signal through line 50 that the transmission is now in neutral.

At that time, the electronic control unit will begin to change the engine speed to a speed that is calculated to match the synchronization speed necessary at the output shaft 30 for the next speed ratio which is to be expected. The operator will be able to provide an indication of whether an upshift or a downshift is next expected through switch 29, and the electronic control unit 38 will calculate the desired engine input speed based upon that next selected gear ratio. The desired speed is determined by multiplying the transmission output speed with this ratio.

The electronic control unit is provided with a positive signal of neutral and will not begin to modify the output speed of the engine until the neutral signal is received. Thus, the electronic control unit will not change the vehicle speed when engine speed is modified to achieve the speed synchronization. Moreover, since a positive signal is provided to the electronic control unit when the transmission is re-engaged, the electronic control unit will know when it can deactivate modification of the engine speed and return control to the operator.

The basic engine control system as disclosed above is disclosed and claimed in co-pending U.S. patent application Ser. No. 08/508,135, entitled "ENGINE SPEED SYNCHRONIZATION SYSTEM FOR ASSISTING A MANUAL TRANSMISSION SHIFT." The system for eliminating torque when moving the transmission out of gear towards neutral is disclosed in co-pending U.S. patent application Ser. No. 08/508,155, entitled "METHOD AND APPARATUS FOR ASSISTING AND SHIFTING TRANSMISSION TO NEUTRAL." Other features of a system that would preferably incorporate this inventive switch are disclosed in co-pending U.S. patent application Ser. No. 08/508,153, entitled "FOUR-POSITION SWITCH FOR SHIFT ASSIST SYSTEM"; U.S. patent application Ser. No. 08/508,307, entitled "OPERATOR INPUT SYSTEM FOR GEAR SHIFT ASSIST MECHANISM;" co-pending U.S. patent application Ser. No. 08/508,996, entitled "AUTOMATIC RANGE SHIFT FOR MULTI-SPEED TRANSMISSION;" co-pending U.S. patent application Ser. No. 08/508,111, entitled "ENGINE SPEED RETARDATION ON A TRANSMISSION UPSHIFT;" and U.S. patent application Ser. No. 08/508,156 entitled "COMBINED SYSTEM FOR ASSISTING SHIFTING OF MANUAL TRANSMISSION WITHOUT CLUTCHING." The above applications are all being filed on the same day as this application.

Although a preferred embodiment of this invention has been disclosed, a worker of ordinary skill in the art would recognize that certain modifications would come within the scope of this invention. For that reason, the following claim should be studied to determine the true scope and content of this invention.

We claim:

1. A vehicle drive comprising:
   an engine having an output shaft;
   a transmission having a plurality of selectively actuated speed ratios;
   a manual stick shift for shifting said transmission between said speed ratios;
   an electronic control unit for controlling the output speed of said engine; and
   a switch system for monitoring when said multi-speed transmission is engaged and when said multi-speed transmission is in neutral, said switch system completing one circuit for providing a positive electric signal to said electronic control unit when said transmission is a gear-engaged state, and completing another circuit to provide a separate signal when said transmission is in neutral.

2. A vehicle drive as recited in claim 1, wherein a single switch is utilized.

3. A vehicle drive as recited in claim 1, wherein said switch system also provides an indication to the said electronic control unit when said transmission is in a transition between said gear-engaged state to said neutral state.

4. A vehicle drive as recited in claim 1, wherein said electronic control unit further incorporates a speed control system for synchronizing an output speed of said engine output shaft with the speed that will be desirable at the next selected gear speed when an operator is shifting gears in said multi-speed transmission.

5. A vehicle drive as recited in claim 4, wherein said electronic control unit does not begin to modify an output speed of said engine to match said synchronization speed until a positive signal is received from said switch system that said transmission has moved to neutral.

6. A vehicle drive as recited in claim 1, wherein said switch system includes a switch plunger reciprocating within a switch housing, said switch housing having contacts at both axial ends of movement of said switch plunger to provide said circuits.

7. A vehicle drive as recited in claim 6, wherein said switch plunger being in contact with a neutral shaft which moves as said multi-speed transmission moves between gear-engaged and neutral states, said neutral shaft having a cam surface, and said switch plunger moving along said cam surface between said extreme axial ends of said housing as said neutral shaft moves between said neutral and gear-engaged positions.

8. A vehicle drive as recited in claim 7, wherein said neutral shaft is mechanically connected into said multi-speed transmission such that it is in a first position when said multi-speed transmission is in neutral and is in a second position spaced from said first position when said transmission is in said gear-engaged state.

9. A vehicle drive as recited in claim 1, wherein said manual stick shift is mechanically connected to said multi-speed transmission for manually moving components to shift said speed ratios.

10. A vehicle drive as recited in claim 9, wherein a neutral shaft is moved by components of said multi-speed transmission between two positions, with said neutral shaft being mechanically connected to said transmission to be in a first position when said multi-speed transmission is in neutral and said neutral shaft being driven to a second position when said multi-speed transmission is in a gear-engaged state, said switch system including at least one switch plunger which is moved as said neutral shaft moves between first and second positions.

11. A method of operating a vehicle comprising the steps of:
  a. providing an engine having an output shaft, a clutch on said engine output shaft, a multi-speed transmission selectively driven by said engine output shaft through said clutch, a stick shift for manually directing said transmission to shift between speeds, an electronic control unit for controlling the output speed of said engine, and a switch system for completing a first circuit for providing a positive electronic signal to said electronic control unit of when said transmission is in neutral and a second circuit for providing a positive electrical signal when said transmission is in a gear-engaged position;
  b. operating said vehicle and controlling the speed of said engine with said electronic control unit;
  c. monitoring the position of said switch system as a shift is occurring;
  d. and providing a signal to said electronic control unit from said switch system second circuit when a gear is engaged in said multi-speed transmission and said first circuit when said transmission is in a neutral state.

12. A method as recited in claim 11, wherein said electronic control unit begins to control said engine output speed to match said engine output speed to a desired speed with the next expected gear ratio during a gear shift on said multi-speed transmission, said modification of said engine output speed not beginning until said electronic control unit receives a positive signal from said switch system that said transmission is in neutral.

13. A method as recited in claim 12, wherein said electronic control unit returns said engine control to operator control once said switch system has provided a signal to said electronic control unit that said transmission is in a gear-engaged position.

14. A method as recited in claim 11, wherein said switch system is moved between positions indicating a neutral state and a gear-engaged state by movement of a neutral shaft, said neutral shaft being mechanically connected into said multi-speed transmission such that it is driven between two positions when said transmission is moved from neutral to a gear-engaged position, and method step d includes the substeps of utilizing said neutral shaft to move said switch system to be at positions where said signals are provided.

15. A method as recited in claim 14, wherein said neutral shaft has a cam surface and said switch system includes a single switch plunger which is driven between two axial positions by said cam surface of said neutral shaft, said neutral shaft being driven between two positions as said transmission moves between a gear-engaged and a neutral state, and said cam surface on said neutral shaft driving said switch plunger to provide said neutral and gear-engaged signals.

16. A method as recited in claim 11, wherein said stick shift is mechanically connected to said multi-speed transmission to move transmission components to effect a speed shift.

17. A method as recited in claim 16, wherein said switch system is moved between positions indicating a neutral state and a gear-engaged state by movement of a neutral shaft, said neutral shaft being mechanically connected into said multi-speed transmission such that it is driven between two positions when said transmission is moved from neutral to a gear-engaged position, and method step d includes the substeps of utilizing said neutral shaft to move said switch system to be at positions where said signals are provided.

18. A method as recited in claim 17, wherein said electronic control unit further looks for faults in the operation of said switch system, said fault detection including identifying the occurrence of both said gear engaged in neutral states being signaled at one time, and said fault detection further including monitoring the time said neutral switch is neither in a gear-engaged or a neutral state, and identifying a fault should said time exceed a predetermined time limit.

19. A method as recited in claim 18, wherein said electronic control unit identifies a fault should both a gear engaged and a neutral signal be received at any one time.

20. A method as recited in claim 11, wherein said signal for a neutral state and said signal for a gear-engaged state are both connected to said electronic control unit through different signal lines.

21. A vehicle drive comprising:
  an engine having an output shaft;
  a transmission having a plurality of selectively actuated speed ratios, said transmission being movable between a neutral and a gear-engaged state, a neutral shaft being driven by said transmission between a first position indicating said transmission is in a neutral state, and a second position indicating said transmission is in a gear-engaged state;
  an electronic control unit for controlling the output speed of said engine; and
  a switch system for monitoring when said multi-speed transmission is in said engaged state and when said multi-speed transmission is in said neutral state, said switch system being driven between a position wherein a first circuit is completed indicating a neutral state and a position wherein a second circuit is completed indicating a gear-engaged state by movement of said neutral shaft, said switch system then providing a positive signal of both said neutral position and said gear-engaged position to said electronic control unit.

22. An apparatus as recited in claim 18, further including a manual stick shift for shifting transmission between said speed ratios.

23. A vehicle drive as recited in claim 21, wherein said switch system further has a transition position when said multi-speed transmission is neither fully in a neutral state or in a gear-engaged state, and said electronic control unit sensing the absence of either a positive neutral state or a positive gear-engaged state has a signal that such multi-speed transmission is in a transition state.

24. An apparatus as recited in claim 21, wherein said switch system includes a single switch plunger movable within a switch housing between two extreme positions, said switch plunger being driven by said neutral shaft between said two positions, one of said two extreme positions being a position wherein said transmission is in a neutral state and the other of said two extreme positions being a position indicating said transmission is in a gear-engaged state, and said switch plunger being driven by said neutral shaft between said two extreme positions, said transition state being indicated by said switch plunger making contact with neither of said two extreme positions.

* * * * *